United States Patent [19]

Boka et al.

[11] Patent Number: 5,335,179
[45] Date of Patent: Aug. 2, 1994

[54] UNIFIED SPACECRAFT ATTITUDE CONTROL SYSTEM WITH PSEUDO-COMPLEMENTARY PAIRED THRUSTERS

[75] Inventors: Jeffrey B. Boka, Trenton; Naresh R. Patel, Bellmawr, both of N.J.; Kevin D. Kim, King of Prussia, Pa.; David S. Shaw, Plainsboro, N.J.

[73] Assignee: General Electric Co., East Windsor, N.J.

[21] Appl. No.: 996,660

[22] Filed: Dec. 24, 1992

[51] Int. Cl.⁵ .................. B64G 1/24; B64G 1/26
[52] U.S. Cl. .................. 364/434; 364/459; 244/164; 244/169; 244/171
[58] Field of Search .............. 364/434, 459; 244/164, 244/171, 169, 172

[56] References Cited

U.S. PATENT DOCUMENTS

| | | | |
|---|---|---|---|
| 4,599,697 | 7/1986 | Chan et al. | 364/434 |
| 4,848,706 | 7/1989 | Garg et al. | 244/169 |
| 4,961,551 | 10/1990 | Rosen | 244/164 |
| 5,020,744 | 6/1991 | Schwarzschild | 244/164 |
| 5,020,746 | 6/1991 | Anzel | 244/169 |
| 5,058,835 | 10/1991 | Goodzeit et al. | 244/165 |
| 5,098,041 | 3/1992 | Uetrecht | 244/164 |
| 5,130,931 | 7/1992 | Paluszek et al. | 364/459 |
| 5,140,525 | 8/1992 | Shankar et al. | 364/459 |
| 5,201,833 | 4/1993 | Goodzeit et al. | 244/165 |

Primary Examiner—Thomas G. Black
Assistant Examiner—Julie D. Day
Attorney, Agent, or Firm—W. H. Meise; C. A. Berard; S. A. Young

[57] ABSTRACT

A unified spacecraft attitude control system includes a memory aboard the spacecraft, in which a linear transformation matrix $[\alpha]$ is stored, which includes information identifying pseudo-complementary pairs of thrusters, and the characteristics of each pseudo-complementary pair. During each control cycle of the spacecraft attitude control system, the error signal is multiplied by a gain representing a desired slew rate to form pulse-width signals $\{pw\}$ for the pseudo-complementary paired thrusters. An augmented pulse-width vector matrix $\{PW\}$ is formed by transformations, to eliminate negative values of pulse width. The actual thruster pulse widths $\{\Delta t\}$ are calculated as $\{\Delta t\}=[\alpha]\{PW\}$. The thrusters are energized by limited values of $\{\Delta t\}$.

5 Claims, 5 Drawing Sheets

ND SPACECRAFT ATTITUDE CONTROL
UNIFIED SPACECRAFT ATTITUDE CONTROL SYSTEM WITH PSEUDO-COMPLEMENTARY PAIRED THRUSTERS

BACKGROUND OF THE INVENTION

This invention relates to spacecraft attitude control systems, and more particularly to unified spacecraft attitude control systems in which the thrusters need not be provided in distinct pairs about the center of mass, but in which the control processor accommodates the actual thruster orientations.

Many prior art attitude control systems require that the thrusters be provided in pairs, with the elements of each pair having the same moment arm about the center of mass or gravity of the spacecraft. When a spacecraft is being assembled, the location of the center of mass can move about within the spacecraft from time to time as a result of design changes in the bus or each payload. It is costly and inconvenient to change the thruster mounting arrangements each time the center of mass changes, especially considering that each spacecraft may have sixteen or more thrusters, and also considering that impingement of the thrusters plumes on spacecraft structures must be considered when orienting each thruster. It is desirable to accommodate such changes in the center of mass without rewriting software or changing the physical mounting of the thrusters. This was done in the prior art by rewriting the software after each change. Software changes might also be required in the prior art as a result of differences in the specific impulse characteristics of the various thrusters, or changes thereto.

A spacecraft attitude control system is described in U.S. Pat. No. 5,130,931, issued Jul. 14, 1992 in the name of Paluszek et al. The Paluszek et al system is directed toward the problem of rewriting attitude control software as a result of changes of the center of mass of the spacecraft which may occur from time to time during its design, or which may occur during operation. The Paluszek et al controller sums six difference equations, each of which represents the maximum force or torque which each thruster can produce and a throttling factor, to produce a single scalar equation relating the variables to a performance index. The performance index is maximized by an iterative process aboard the spacecraft to determine the throttle values to be applied to the thrusters. The iterative process is repeated each control cycle.

U.S. Pat. No. 5,140,525, issued Aug. 18, 1992 in the name of Shankar et al, describes an attitude control system for a spacecraft which reduces the on-board signal processing load required to calculate the thrust desired for each thruster. This is accomplished by loading a weighted pseudo inverse of a pulse-width-to-torque transformation matrix C onto on-board memory. This avoids the need for the flight computer to perform iterative calculations. However, the Shankar et al system is most advantageous when the thrusters are arranged in complementary pairs.

SUMMARY OF THE INVENTION

A spacecraft includes an attitude control system for controlling attitude about one or more of the spacecraft axes. The spacecraft includes a plurality of thrusters which generate components of thrust in a plane orthogonal to the axis. An attitude sensing arrangement generates attitude control signals representative of the attitude of the spacecraft about the axis about which control is desired. An error signal generator is coupled to the sensor, for comparing the attitude signals with a commanded attitude, and for generating error signals in response to the comparison. A memory arrangement located aboard the spacecraft is preloaded with torque information $\alpha$ relating to the torque produced by each of the thrusters about at least the orthogonal projection of the actual center of mass of the spacecraft into the plane, or, in a 3-axis control system, with information relating to the torque produced by each thruster about the center of mass of the spacecraft. The center of mass may be determined by any conventional method, such as by calculation from the known dimensions and masses of the various components of the spacecraft. A thruster control processor is coupled to the memory, to the error signal generator, and to the thrusters for generating pulse width (pw) signals related to the product of the magnitude of the desired slew rate and the magnitude of the error signal for the pseudo-complementary paired thrusters. The thruster control processor generates duty cycle signals for the actual thrusters in response to the pulse width signals by multiplying the magnitude of the augmented pulse width signals by the torque information from the memory arrangement, to thereby establish the pulse width per unit time to be applied to those of the actual thrusters which are to be energized. Finally, the thruster control arrangement limits the values of the duty cycle signals to lie within predetermined limits, and the limited duty cycle signals are applied to the selected thrusters.

DESCRIPTION OF THE INVENTION

Figure 1:
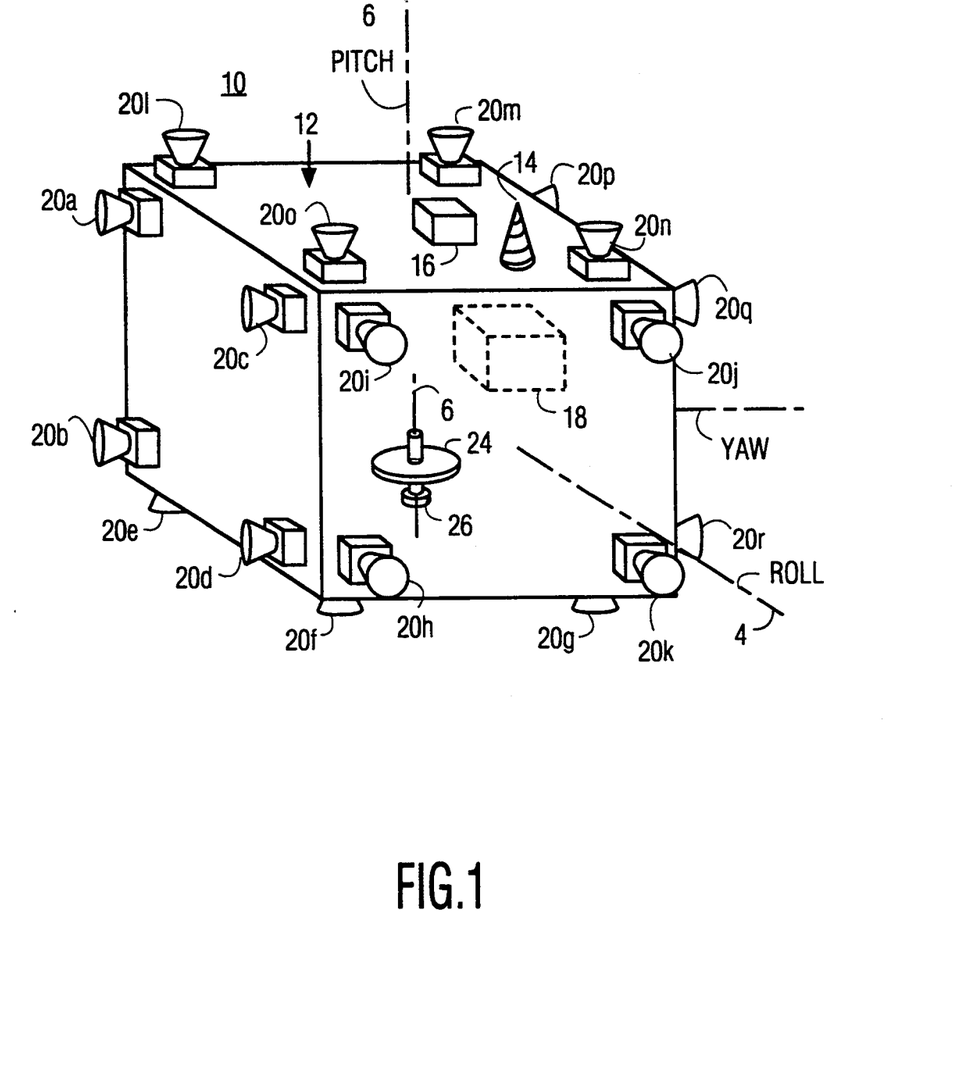
FIG. 1 is a perspective or isometric view of a spacecraft including a plurality of thrusters.

FIG. 1 illustrates a spacecraft which is controlled in accordance with the invention. In FIG. 1, a spacecraft 10 having a body 12 includes an omnidirectional antenna illustrated as 14 which may be used for communication and command, and also includes attitude sensors for roll, pitch and yaw, which are illustrated together as a block 16. Roll, pitch and yaw axes 4, 6 and 8 are associated with spacecraft body 12. Attitude signals representative of roll, pitch and yaw are coupled (by means which are not illustrated) to a controller illustrated as a block 18 for generating thruster control signals. A plurality of thrusters illustrated as 20a–20r (where the hyphen represents the word "through") are associated with spacecraft body 12 and are connected (by means not illustrated) to controller 18 for being controlled thereby. One or more momentum wheels, one of which is illustrated as 24, may be provided, together with a wheel speed sensor arrangement 26, which may be coupled to controller 18.

Figure 2A:
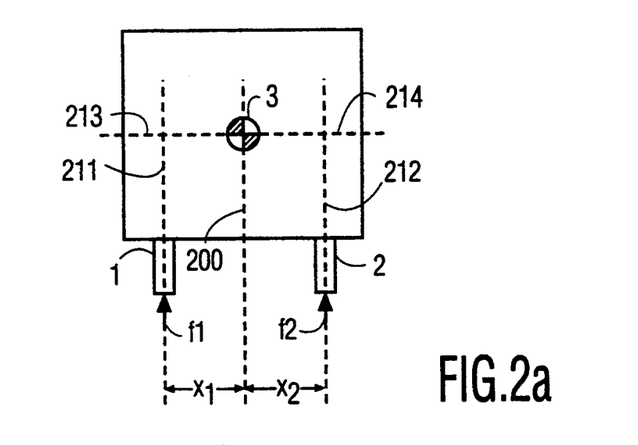
FIG. 2 is a highly simplified illustration of the locations of some thrusters in a symmetrical arrangement relative to the center of mass.

FIG. 2a is a simplified representation of spacecraft 10 of FIG. 1, illustrating representative thrusters 1 and 2 which lie in the plane of the figure. The spacecraft center of mass or of gravity (CG), or at least the orthogonal projection of the center of mass, is illustrated as 3. As illustrated in FIG. 2a, thruster 1 when energized is capable of producing a force designated fl along the line of action 210 of thruster 1, and thruster 2, when energized, produces a force, illustrated by an arrow $f_2$, along its line of action 212. The clockwise (CW) torque which can be produced by thruster 1 about center of mass 3 is the product of the force represented by arrow fl multiplied by the moment arm represented by dash line 213, which has a length $x_1$. Similarly, thruster 2 can produce a counterclockwise (CCW) torque about center of mass 3, the magnitude of which is the product of force f2 multiplied by moment arm 214. As illustrated in FIG. 2a, the length of moment arm 214 is $x_2$, which is equal to the length $x_1$ of moment arm 213. Thus, if forces fl and f2 are equal, energization of both thrusters 1 and 2 results in generation of equal clockwise and counterclockwise torques about center of mass 3.

Figure 2B:
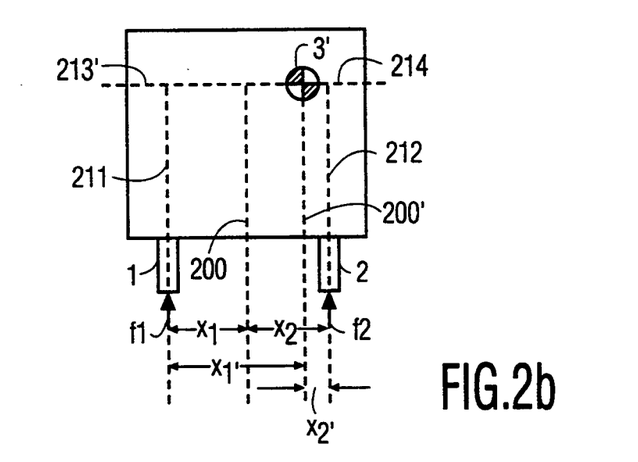
FIG. 2b illustrates the effect of motion of the center of mass.

FIG. 2b illustrates an arrangement similar to that of FIG. 2a, but in which the center of mass is illustrated at a new location 3'. This can be the result of an actual change of the center of mass resulting from a shift in the expendables carried aboard the spacecraft or payload, or can represent a change resulting from design modifications occurring during the design/construction of the spacecraft. As illustrated in FIG. 2b, the length of the moment arm 213' extending between line of action 211 of thruster 1 and center of mass 3' is greater than that of moment arm 213 of FIG. 2a, and the length of moment arm 214 extending between the line of action 212 of thruster 2 of FIG. 2b and center of mass 3' is shorter than corresponding moment arm 214 of FIG. 2a. The length of moment arm 213' in FIG. 2b is designated $x_1'$, and the length of moment arm 214' is designated $x_2'$. As a result, thrusters 1 and 2 of FIG. 2b will produce different torques about center of mass 3', even if the thrust forces fl and f2 which they produce are equal in magnitude. The torques produced by thrusters 1 and 2 will differ by the ratio of the moment arms $x_1'$, $x_2'$, i.e. the clockwise torque will exceed the counterclockwise torque by the ratio $x_1'/x_2'$.

Figure 2C:
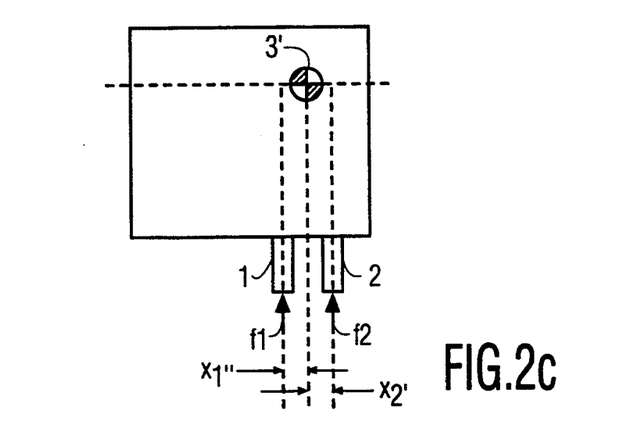
FIG. 2c illustrates pseudo-complementary paired thrusters equivalent to the thrusters of FIG. 2b.

The invention stores information on board the spacecraft, relating the locations and orientation of the thrusters to the center of mass, and the processing accomplishes a reduction in the duty cycle or throttle setting of that thruster (thruster 1 in FIG. 2b) having the longer moment arm (213' in FIG. 2b), in order to produce what might be called a pseudo-thruster pair. FIG. 2c is similar to FIG. 2b, and corresponding elements are designated by like reference numerals. In FIG. 2c, thruster 2 is in the same location as thruster 2 in FIG. 2b, having a moment arm $x_2'$. Instead of thruster 1, the control processing according to the invention reduces the force fl produced by actual thruster 1 of FIG. 2b to effectively generate pseudo-thruster 1' of FIG. 2c. Insofar as generation of torques is concerned, thruster 1' of FIG. 2c has an effective moment arm $x_1''$ equal to the length of moment arm $x_2'$ of thruster 2, and has an effective thrust of fl, equal to the thrust of thruster 1 of FIGS. 2a and 2b. Thruster 1' and 2 together constitute a pseudo-complementary pair of thrusters.

Figure 3:
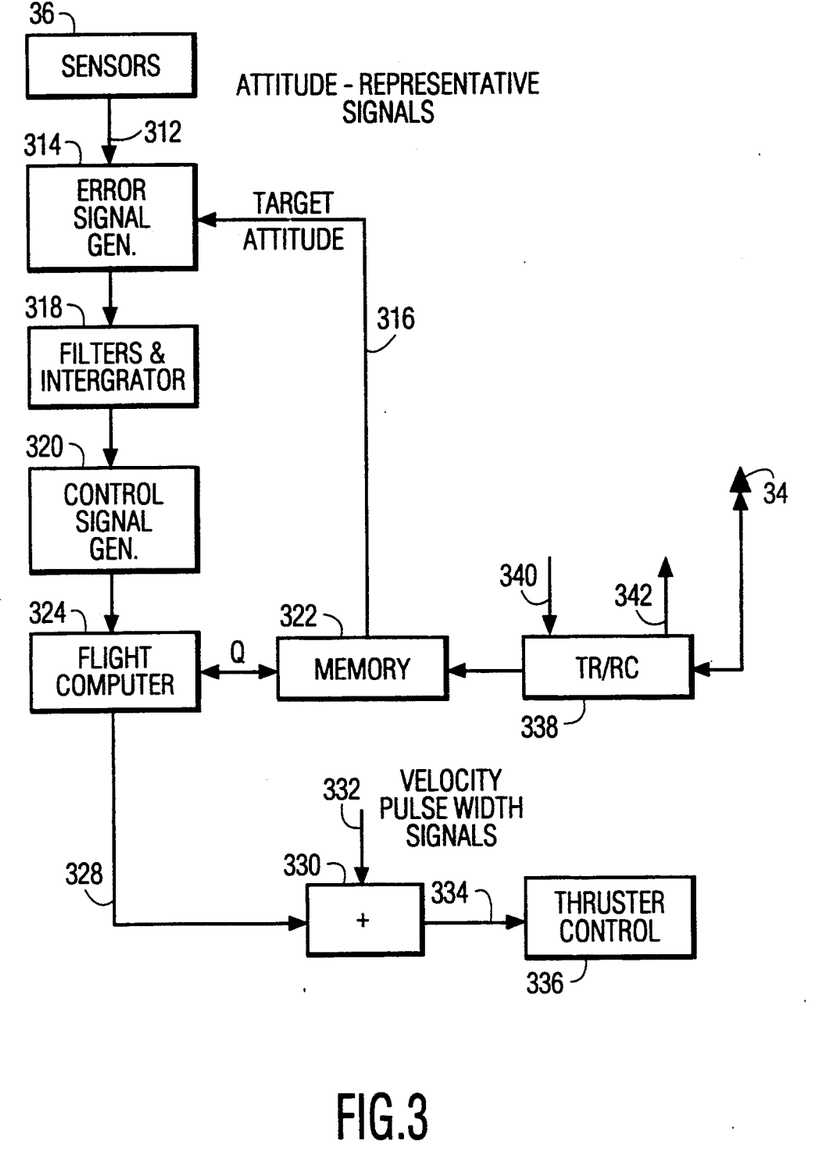
FIG. 3 is a simplified block diagram of a spacecraft attitude control system according to the invention.

FIG. 3 is a simplified block diagram of an attitude control system according to the invention which may be used in the arrangement of FIG. 1. Elements of FIG. 3 corresponding to FIG. 1 are designated by like reference numerals. In FIG. 3, sensors 36 generate signals on a data path 312 which are representative of the 3-axis attitude of the spacecraft. The attitude-representative signals are applied to an error signal generator illustrated as a block 314, which also receives target attitude information over a data path 316 from a portion of a memory illustrated as 322. Memory 322 may be a ROM, or a RAM which can be updated with new information from a transmitter-receiver (TR/RC) 338 as conditions change. Error signal generator 314 compares the actual and target attitudes, and generates error signals x, which are filtered and integrated in a block 318 to reduce noise. The filtered signals produced by block 318 are applied to a control signal generator illustrated as a block 320. Control signal generator 320 sums error terms, e.g. signals proportional to the error signal, its integral and its derivative, to form PID (proportional-integral-derivative) torque demand signals. Spacecraft control loops using PID controllers are described, for example, in U.S. Pat. No. 5,025,381, issued Jun. 18, 1991 in the name of Goodzeit et al. The torque demand signals are applied to a processor portion, illustrated as a block 324, of the flight computer. The portion of the flight computer illustrated as 324 processes the torque demand signals from block 320, in conjunction with prestored signals from memory 322, relating to information about the duty cycles of the pseudo-complementary paired thrusters and their relationship with the center of mass, to produce processed torque demand signals. The processed torque demand signals are applied over a path 328 to a block 330, which represents the summing of the torque demand signals with velocity pulse width signals applied to block 330 over a path 332 from a conventional generating arrangement. The summed demand signals are applied over a path 334 to a thruster control or thruster drive circuit arrangement illustrated as a block 336. While block 324 has been specifically identified as a portion of the flight computer, those skilled in the art will recognize that the processing of blocks 314, 318, and 320 may also be performed in the flight computer.

Figure 4:
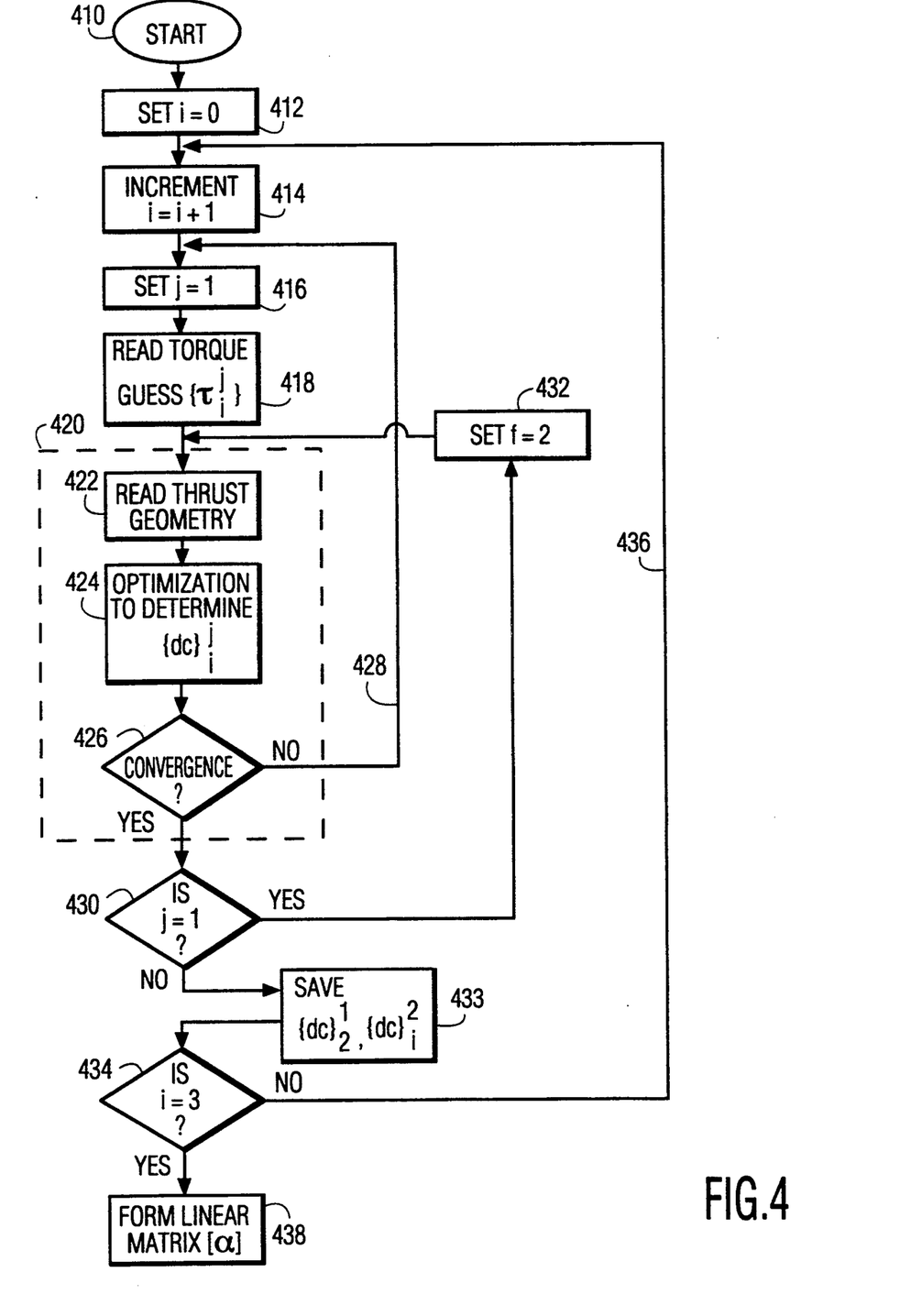
FIG. 4 is a simplified flow chart representing calculations performed to generate a transformation matrix for loading onto the spacecraft attitude control system of FIG. 3.

FIG. 4 is a flow chart representing processing which may be done on the ground before launch or concurrently with the design and fabrication of the spacecraft, to produce a linear transformation matrix [$\alpha$], which is loaded into a memory associated with the spacecraft, and which identifies pseudo-complementary pairs of thrusters such as that pair described in conjunction with FIG. 2c, and their characteristics. In FIG. 4, the logic starts at a start block 410, and proceeds to a further block 412, which represents the setting of an axis-representative index i to a value of zero. From block 412, the logic proceeds to a block 414, which represents the incrementing of index i. Index i can take values of 1, 2 or 3, representing one of the three axes about which attitude control may be performed. The setting of index i to unity represents performing calculations in relation to one of the roll, pitch or yaw axes.

From block 414, the logic flows to a block 416, which represents the setting of polarity index j to a value of unity. The selection of j=1 indicates that the calculations represented by succeeding blocks 418, 422, 424 and 426 are performed for the positive direction of torque about the $i^{th}$ axis. From block 416, the logic flows to a block 418, which represents the reading from a keyboard, or from preloaded memory, of an initial estimate or "guesstimate" of the net torque $\{\tau\}_i^j$ produced about the $i^{th}$ axis by those thrusters whose lines of action produce torques of a particular polarity about that axis, where the braces $\{\}$ represent a vector matrix, the subscript i refers to the axis about which the torque $\tau$ is generated, and the superscript j takes on a value of either 1 or 2, representing positive or negative torque polarity, respectively. As an example, the six selected torque vectors may be represented by the following three matrices:

$$\{\tau\}_1^1 = \begin{Bmatrix} 50 \\ 0 \\ 0 \end{Bmatrix} \tag{1}$$

$$\{\tau\}_2^1 = \begin{Bmatrix} 0 \\ 50 \\ 0 \end{Bmatrix} \tag{2}$$

$$\{\tau\}_3^1 = \begin{Bmatrix} 0 \\ 0 \\ 100 \end{Bmatrix} \tag{3}$$

with the assumption that these are complementary torques, so that $\{\tau\}_1^2$, $\{\tau\}_2^2$ and $\{\tau\}_3^2$ are the negative of $\{\tau\}_1^1$, $\{\tau\}_2^1$ and $\{\tau\}_3^1$, respectively.

From logic block 418, the logic flows to a block 422 within a logic region 420. Logic region 420 represents a region for determination of the minimum duty cycle required to achieve the desired torque $\{\tau\}_i^j$ using the thrusters providing torques about the axis in question. Minimum duty cycle corresponds to minimum fuel consumption for the desired torque. Consequently, logic region 420 represents minimization of the fuel consumption required to achieve a particular torque. This, in turn, effectively establishes the operating duty cycle to form the pseudo-complementary thruster pairs.

Within block 420, logic block 422 represents the reading, from memory or from a keyboard, of the thrust or force $\{f\}$ associated with each thruster, and of the associated geometry of the lines of thrust relative to the spacecraft center of mass. From these values, the total torque $\{\tau\}$ produced by each thruster about the axis in question can be determined. The information read from memory may be represented as a torque matrix M of the actual thrusters. An exemplary matrix M for the case of six thrusters is:

$$M = \begin{bmatrix} 13 & 28.68 & -40.0 & 20 & 33.57 & -16.07 \\ -10 & -45 & -45.0 & 6 & 50.5 & 50.5 \\ 101 & 95.0 & -87.47 & -101 & -88.5 & 87.47 \end{bmatrix} \tag{4}$$

Block 424 represents the determination of the duty cycle $\{dc\}$ by the use of any standard technique, such as the Newton method, as described in "*Numerical Recipes—The Art of Scientific Computing*", W. H. Prass, B. P. Flannery, S. A. Teukolsky, W. T. Vetterling, Cambridge University Press, 1986, together with the method of slack variables, as described in "Applied Optimal Control", A. E. Bryson, Jr., Y. C. Ho, John Wiley and Sons, 1975 by an iteration process.

In general, the iteration or minimization process within block 424 requires choosing a quadratic cost function G, which is a function of duty cycle $\{dc\}$, torque $\{t\}$, and thrust $\{f\}$. Cost function G is to be minimized, together with related constraints. To minimize duty cycle, $$G(\{dc\},\{\tau\},\{f\}) \tag{5}$$

is minimized, with constraints $$\{g\}(\{dc\},\{\tau\},\{f\}) = 0 \tag{6}$$

and $$0 < \{dc\} < 1 \tag{7}$$

where $\{dc\}$, $\{f\}$ and $\{\tau\}$ are the thruster duty cycle, force and torque vector matrices, respectively, for the set of thrusters, calculated during each control cycle, $\{\tau\} = M\{dc\}$, $\{f\} = F\{dc\}$, respectively, where F is the force matrix of the actual thrusters, and M has already been defined. Thus, $\{g\}$ may be a function such as $$g = (M*dc) - \tau \tag{8}$$

whence from equation (6), $\{g\} = 0$, and $\tau = M*dc$. The duty cycle of each thruster is constrained by equation (7) to lie between the values of 0 and unity, which are the practical maximum and minimum values.

For example, equation (5) can be $$G = [M\{dc\}_i^j - \{\tau\}_i^j]^T [M\{dc\}_i^j - \{\tau\}_i^j] \tag{9}$$

(where superscript T represents matrix transposition) which is to be minimized, subject to $$\{0\} < \{dc\}_i^j < \{1\} \tag{10}$$

Using the method of slack variables, an augmented cost function can be formed as $$\overline{G} = \{M\{dc\}_i^j - \{\tau\}_i^j\}^T \{M\{dc\}_i^j - \{\tau\}_i^j\} + \tag{11}$$

$$\{\lambda\}^T(\{dc\}_i^j \{\beta^2\}) + \{\Lambda\}^T(\{dc\}_i^j + \{\gamma^2\} - \{1\})$$

where $\{\lambda\}$, $\{\Lambda\}$ denote the vectors of Lagrange multipliers and $\{\beta^2\}$, $\{\gamma^2\}$ denote the vectors of slack variables squared. Upon taking partial derivatives of $\overline{G}$ with respect to the duty cycle vector, the slack variables, and the Lagrange multipliers, and setting the individual equations equal to zero, a system of non-linear equation results in the form $$[\{dc\}_i^j, \{\lambda\}, \{\Lambda\}, \{\beta\}, \{\Theta\}] = \{0\} \tag{12}$$

which can be solved by a non-linear equation solver routine (e.g. Newton Method) to yield $\{dc\}_i^j$.

The solution produced by minimization block 424 of FIG. 4 is a set or vector matrix of duty cycles, one of which is associated with each thruster of the spacecraft, where an unused thruster has a value of zero within the vector matrix. A decision block 426 determines whether the iterative process of block 424 has converged, as for example by determining if a solution has been produced after a particular period of time, and if so, whether the set of duty cycles so produced result in the torque $\{\tau 56 \, j\}$ selected in block 418. Naturally, the determination should have a tolerance, so that convergence is found if the calculated resulting torque is close to the selected torque. If convergence has not occurred, the logic leaves convergence block 426 by the NO output and returns to logic block 416 by way of a logic path 428. The lack of convergence indicates that the initial torque estimate $\{\tau_j\}$ cannot be realized by the available thrusters. A new estimate is made in block 418, and the processes of blocks 420, 422, 424 and 426 are repeated. Eventually, minimization block 424 will converge to a set of duty cycles which will provide the net torque selected in block 418. Decision block 426 will thereupon direct the logic by its YES output to a block 433, representing saving of the solution, and then to a further decision block 430, which compares the current value of polarity index j with unity. If j is equal to unity, the positive polarity duty cycles have been calculated for the $i^{th}$ axis. This leaves to be determined the second (negative) polarity torque about the i=1 axis, and two polarities of torques for the i=2 and i=3 axes. The logic leaves decision block 430 by the YES output, and proceeds to a block 432, which sets the value of index j equal to 2. The logic then flows back optimization block 420, using the same torque guess for the negative polarity which gave a solution for the positive polarity. When optimization is complete, the logic leaves convergence block 426 by the YES output, and again flows to decision block 430. This time, however, index j is equal to 2, so the logic leaves decision block 430 by the NO output, and flows to a further decision block 434. Decision block 434 compares the value of index i with the number 3. If index i has not reached the number 3, calculations have not been completed for all three spacecraft axes, and the logic leaves decision block 434 by way of the NO output and a path 436, and returns to block 414. In block 414, index i is incremented to begin the calculations about another axis.

Eventually six sets of duty cycles $\{dc\}_i^j$ will have been determined and stored, one set for each of two polarities of torque about each of three control axes. When the minimum value of duty cycle required to produce a torque in a given direction about a given axis is determined, simple proportioning may be used to establish any other value of torque (in the same direction). Thus, only one value of torque for each axis and polarity (for a total of six) need to be determined by the process of FIG. 4. When the calculations are completed, the logic leaves decision block 434 by the YES output, and flows to a further block 438, which represents the formation of a linear transformation matrix $[\alpha]$, which will be loaded into the spacecraft memory. Linear transformation matrix $[\alpha]$ represents the transformation between the pseudo-complementary thrusters and the actual thrusters. Linear transformation matrix $[\alpha]$ has six (6) columns and N rows, where N is the number of thrusters. The six columns represent two polarities of torque about each of three axes.

$$[\alpha] = [\{dc\}_1^1 \ \{dc\}_2^1 \ \{dc\}_3^1 \ \{dc\}_1^2 \ \{dc\}_2^2 \ \{dc\}_3^2] \quad (13)$$

where each $\{dc\}_i^j$ is an N×1 vertical column matrix. The loading of linear matrix $[\alpha]$ may be by a direct data path between the ground station computer and the spacecraft memory, or by loading onto a transfer medium for eventual loading into the spacecraft memory.

From the exemplary values of $\{dc\}_i^j$ of equations 1, 2, 3 and 4, the exemplary $[\alpha]$ is $$[\alpha] \begin{bmatrix} 0 & 0 & .8575 & 0 & 0 & 0 \\ .8135 & 0 & 0 & .0514 & .6176 & 0 \\ 0 & .0199 & .1548 & .9339 & .5118 & .4477 \\ .1451 & .7756 & 0 & 0 & .1377 & .2822 \\ .7077 & 0 & 0 & 0 & 0 & .3654 \\ 0 & .9155 & .3078 & .8780 & 0 & 0 \end{bmatrix} \quad (14)$$

Figure 5:
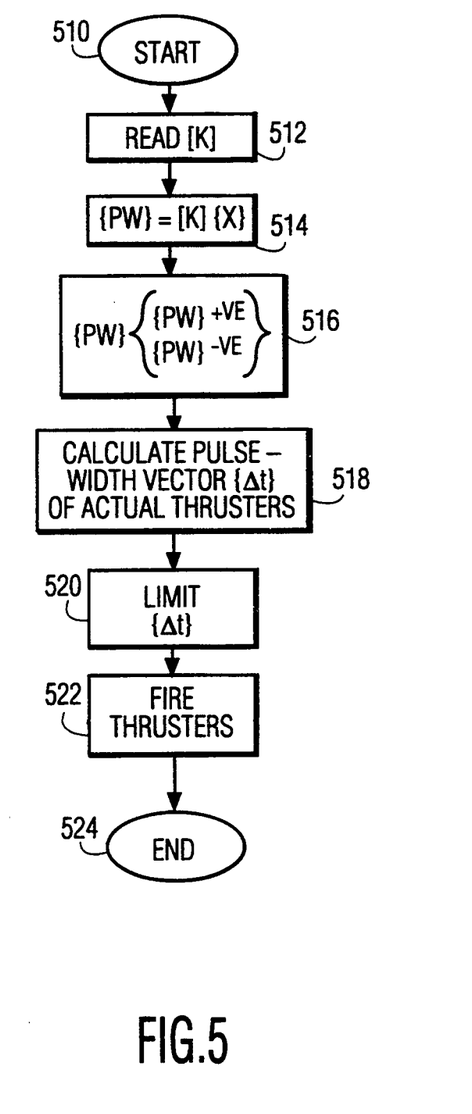
FIG. 5 is a simplified flow chart representing operation of a spacecraft attitude control system according to the invention.

FIG. 5 represents the processing performed aboard the spacecraft, corresponding to the processing performed in block 324 of FIG. 3. In FIG. 5, the logic flow for each control cycle begins at a START block 510, and proceeds to a block 512, which represents the reading from memory. Gain matrix [K], obtained by conventional means, based on the pseudo-complementary paired thruster torques, is preloaded into memory, and essentially establishes the desired slew rate about each axis. From block 512, the logic flows to block 514, which simply multiplies the [K] matrix by the error state matrix $\{x\}$ to produce the unpolarized or unaugmented pseudo-thruster duty cycles $\{dc\}$, or pulse-width vectors $\{pw\}$ if the control cycle time is included $$\{pw\} = [K]\{x\} \quad (15)$$

From block 514, the logic flows to a block 516, which represents formation of the augmented pseudo-thruster pulse-width vector $\{PW\}$ $$\{PW\} = \begin{Bmatrix} \{pw\} + VE \\ \{pw\} - VE \end{Bmatrix} \quad (16)$$

where the "+ve" and "−ve" superscripts means selection of only positive-or negative-polarity pulse-width components, respectively. As an example of augmentation, suppose $$\{pw\} = \begin{bmatrix} 0.25 \\ -1.25 \\ 0.50 \end{bmatrix} \quad (17)$$

Then the augmented complementary pulse width vector is formed as $$\{PW\} = \begin{bmatrix} 0.25 \\ 0.00 \\ 0.50 \\ 0.00 \\ 1.25 \\ 0.00 \end{bmatrix} \quad (18)$$

which simply means that the negative-direction torque in a 3-direction system becomes a positive-direction torque in an augmented six-direction system.

The pulse-width vectors $\{\alpha t\}$ of the actual thrusters are determined in block 518 by the linear transformation $$\{\Delta t\} = [\alpha]\{PW\} \quad (19)$$

Using the example, the pulse widths of the actual thrusters are then $$\{\Delta t\} = [\alpha]\{PW\} = \begin{bmatrix} 0.42875 \\ 0.97538 \\ 0.71715 \\ 0.20840 \\ 0.17692 \\ 0.15390 \end{bmatrix} \quad (20)$$

Finally, the pulse-widths are limited to realizable values, recognizing that pulse width equals duty cycle multiplied by control cycle duration, $$\{\Delta t\}_{min} \leq \{\Delta t\} \leq \{\Delta t\}_{max} \quad (21)$$

in a block 520. The limited values are applied to fire the thrusters in block 522.

The torque impulse delivered by the actual thrusters is calculated as $$\{\tau\}_{actual} = M\{\Delta t\} = \begin{Bmatrix} 12.496 \\ -62.494 \\ 49.991 \end{Bmatrix} \quad (22)$$

and the demand torque impulse from equations (1), (2) and (3) was $$\{\tau\}_{demand} = \begin{bmatrix} 50 & 0 & 0 \\ 0 & 50 & 0 \\ 0 & 0 & 100 \end{bmatrix} \{pw\} = \begin{Bmatrix} 12.500 \\ -62.500 \\ 50.000 \end{Bmatrix} \quad (23)$$

Comparison of equations (22) and (23) shows that the torque resulting from the minimization is very close to the torque demand. The control cycle ends at a block 524. The simplicity of the operations described in conjunction with FIG. 5 is evident, and the operation can be performed rapidly with relatively small computer occupancy. The simplicity of the processing also allows a shorter cycle time, providing improved torque resolution. The plurality of operating modes association with the Shankar et al patent are not explicitly required, but are subsumed into the described operation.

Other embodiments of the invention will be apparent to those skilled in the art. While 3-axis control has been described, one-axis or two-axis control may be performed in an equivalent manner. At the current state of technology, digital processing is preferred for most purposes, but some analog processing may be appropriate. While minimization of duty cycle for a given torque is described, maximization of torque for a given duty cycle set might be an alternative. While pulsed operation of the thrusters is assumed in the above description, throttleable thrusters can be operated in response to the duty cycle or pulse width information. In particular, while the invention has been described in the context of a spacecraft attitude control system, the thruster control may be used for other purposes, such as wheel momentum unloading, for unloading the momentum of a wheel such as wheel 24 of FIG. 1, by coupling speed sensor 26 to controller 18, and performing logic similar to that of FIG. 5.

What is claimed is:

1. A spacecraft including an attitude control system, and defining a center of mass, said spacecraft comprising:

attitude sensing means for generating attitude signal representative of the attitude of said spacecraft about at least one axis;

a plurality of physical thrusters associated with said spacecraft, for generating, in response to limited duty cycle signals, at least components of thrust in mutually opposite diretions about said center of mass of said spacecraft in a plane orthogonal to said axis;

error signal generating means coupled to said sensing means, for comparing said attitude signals with a commanded attitude, and for generating error signals in response to said comparison;

memory means located aboard said spacecraft, said memory means being preloaded with a gain matrix representing the torques which can be generated by pseudo-complementary pairs of said physical thrusters, and with a linear transformation matrix relating to the transformation between said pseudo-complementary thrusters and said physical thrusters; and thruster control processing means coupled to said memory means, to said error signal generating means, and to said physical thrusters, for, during each recurrent control cycle, (a) multiplying said error signals by said gain matrix for generating pseudo-complementary pulse width signals (pw) related to the magnitude of said error signals, (b) generating augmented pseudo-complementary pulse width signals (PW) from said pseudo-complementary pulse width signals, said augmented pseudo-complementary pulse width signals being related to said pseudo-complementary pulse width signals, selected for establishing which of said physical thrusters is to be energized to provide torque in the desired direction, (c) generating pulse width ($\{\Delta t\}$) signals in response to said augmented pseudo-complementary pulse width signals by multiplying the magnitude of said augmented pulse width signals (PW) by said linear transformation matrix ($\alpha$) from said memory means, for establishing the pulse width per unit cycle of those among said thrusters which are to be energized, and (d) limiting the values of said pulse width signals to lie within predetermined limits, to produce said limited duty cycle signals.

2. A method for controlling a spacecraft attitude about a control axis, comprising the steps of:

determining the location of the center of mass of said spacecraft;

for each thruster associated with said spacecraft, determining the maximum thrust which said thruster can produce;

for each said thruster associated with said spacecraft, determining the moment arm of its line of action about said control axis;

for each said control axis, estimating an achievable torque;

forming a cost function (G) relating thruster duty cycle to resulting torque;

minimizing said cost function for said achievable torque to establish a duty cycle vector matrix {dc} defining pseudo-complementary thruster pairs;

from said duty cycle vector matrix, forming a linear transformation matrix relating said duty cycle vector matrix to said thrusters;

storing said transformation matrix in a memory onboard said spacecraft;

aboard said spacecraft, forming an error signal set representing the deviation of the spacecraft attitude from a desired target attitude;

aboard said spacecraft, multiplying said error signal set by a gain-representative value to form a pulse-width representative signal adjusted for the desired slew rate;

aboard said spacecraft, forming an augmented pulse-width signals by converting negative values of pulse width representing a first direction about said axis to positive values in a second direction opposite to said first direction;

aboard said spacecraft, calculating the pulse widths of said thrusters from said augmented pulse-width signals by multiplying said augmented pulse-width signals by said transformation matrix;

aboard said spacecraft, limiting said pulse widths to lie within a predetermined range to thereby produce limited pulse width signals; and firing said thrusters in response to said limited pulse width signals.

3. A method according to claim 2, wherein said step of minimizing said cost function for said achievable torque includes the steps of:

minimizing said cost function to produce an interim duty cycle for each thruster of each pseudo-complementary pair;

calculating an interim torque about said control axis resulting from said interim duty cycle for each said thruster;

comparing said interim torque with said achievable torque to produce a comparison signal; and declaring said interim duty cycle for each thruster to be said duty cycle matrix when said comparison signal indicates that said interim torque equals said achievable torque.

4. A method according to claim 3, wherein said comparing step includes the step of comparing said interim torque with said achievable torque with a tolerance; and said declaring step occurs when said comparison signal indicates that said interim torque equals said achievable torque within said tolerance.

5. A spacecraft including a thruster control system, comprising:

a wheel;

wheel speed sensing means for generating speed signals representative of the speed of said wheel about at least one axis;

a plurality of thrusters associated with said spacecraft, for generating, in response to limited duty cycle signals, at least components of thrust in a plane orthogonal to said axis;

error signal generating means coupled to said sensing means, for comparing said speed with a commanded speed, and for generating error signals in response to said comparison;

memory means located aboard said spacecraft, said memory means being preloaded with torque information in the form of a gain matrix (K) relating to the torque produced by each thruster of a plurality of pairs of pseudo-complementary pairs of thrusters about at least the orthogonal projection of the actual center of mass of said spacecraft into said plane, and with the relationship ($\alpha$) between said pseudo-complementary thrusters and the thrusters;

thruster control processing means coupled to said memory means, to said error signal generating means, and to said thrusters, for, during recurrent control cycle, (a) generating pulse width signals (pw) related to the product of the magnitude of the desired momentum rate and the magnitude of said error signal, (b) generating augmented complementary pulse width signals (PW) from said pulse width signals, said augmented complementary pulse width signals being a subset of said pulse width signals, selected for establishing which of said thrusters is to be energized to provide torque in the desired direction, (c) generating duty cycle (dc) signals in response to said augmented complementary pulse width signals by multiplying the magnitude of said augmented pulse width signals (PW) by said torque information ($\alpha$) from said memory means, for establishing the pulse width per unit cycle of those among said thrusters which are to be energized, and (d) limiting the values of said duty cycle (dc) signals to lie within predetermined limits, to produce said limited duty cycle signals.

* * * * *